(No Model.)

F. F. STEVENS.
NUT LOCK.

No. 302,441.   Patented July 22, 1884.

WITNESSES:
W. W. Hollingsworth
W. X. Stevens.

INVENTOR:
Frank F. Stevens
BY Munn & Co
ATTORNEYS.

UNITED STATES PATENT OFFICE.

FRANK FIERING STEVENS, OF SLATER, MISSOURI.

NUT-LOCK.

SPECIFICATION forming part of Letters Patent No. 302,441, dated July 22, 1884.

Application filed January 26, 1884. (No model.)

*To all whom it may concern:*

Be it known that I, FRANK F. STEVENS, a citizen of the United States, residing at Slater, in the county of Saline and State of Missouri, have invented certain new and useful Improvements in Nut-Locks, of which the following is a description.

This invention relates to that class of devices used in connection with screw-bolts and nuts in situations where they are subject not only to varying strains from the natural changes of temperature, but where they are also subjected to the loosening effect of jar or vibration of the parts to which they are secured.

The object of this invention is, first, to prevent a nut from turning backward on the screw-thread of a bolt when it has once been screwed home to a bearing thereon; second, to form a flexible or self-adjusting seat for a screw-nut, in order that the strain upon the bolt consequent to changes of atmospheric temperature may be lessened and accommodated, to prevent the same from breaking the bolt, and in order that if the nut recedes from a solid bearing it will be followed and its retreat impeded or stopped.

To this end my invention consists in a washer shaped to form a nut-lock, as hereinafter described and claimed, reference being had to the accompanying drawings, in which—

Figure 1:
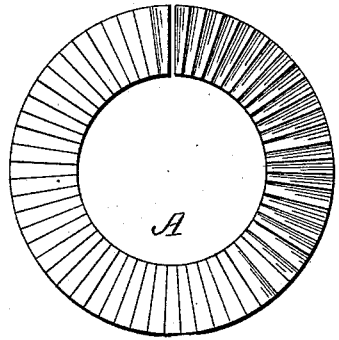
Figure 2:
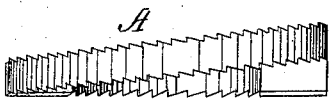
Figure 3:
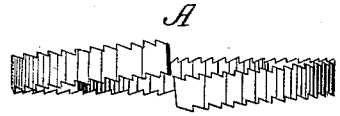

Figure 1 is a front view of my invention. Figs. 2 and 3 are edge views of the same on planes at right angles to each other.

A represents the body of the nut-lock, which consists of a steel-washer radially corrugated on its two faces. The said corrugations form sharp teeth, which point all one way around the circle on one side of the washer, and all the other way around the circle on the other side. The washer is radially cut in two at one side, and the ends formed by said cut are twisted apart, forming the washer into a spiral shape. It is then spring-tempered. There are several ways of making my nut-lock into the form described. It may be cold-punched in the manner usual to forming washers, then cut like a file to form the teeth, then parted at one side, then its two ends bent out of a plane and tempered; or it may be cut like a file in a long straight bar, then heated and wound edgewise upon an arbor like a loose spiral spring, then be cut into single rings and tempered; or bars long enough to make one nut-lock each may be first file cut, then spirally wound, and then tempered. A washer made in this form may be pressed down flat by screwing the nut hard enough upon it, or it may be screwed down until partly compressed, and in either case it will spring to follow the nut in the act of unscrewing and resist said act until it reaches the limit of its spring. Its teeth, facing in opposite ways on its two sides, enable it to take a firm hold against both the nut and the nut-seat, thus holding the nut and itself against retreat, but being free to be moved forward, and permitting the nut to advance freely. Neither the nut or nut-seat require any notches or unusual roughness for this lock to engage them. Its oppositely-facing teeth and its spring render it self-adjusting to both tight and loose nuts.

I am aware that a lock-nut formed as a whole flat washer, and radially corrugated on its two faces, is not new. I am also aware that spiral springs have before been interposed between nuts and nut-seats on bolts, and I do not claim either, broadly, as my invention.

What I claim as my invention, and wish to secure by Letters Patent, is—

A nut-lock consisting of a washer radially corrugated on its two faces, parted at one side and spiral shaped, substantially as and for the purpose specified.

FRANK FIERING STEVENS.

Witnesses:
   EDGAR DULIN JONES,
   ALFRED FROST RECTOR.